(12) United States Patent
Schwesinger et al.

(10) Patent No.: US 9,971,491 B2
(45) Date of Patent: May 15, 2018

(54) GESTURE LIBRARY FOR NATURAL USER INPUT

(71) Applicant: MICROSOFT TECHNOLOGY LICENSING, LLC, Redmond, WA (US)

(72) Inventors: Mark Schwesinger, Bellevue, WA (US); Emily Yang, Seattle, WA (US); Jay Kapur, Redmond, WA (US); Sergio Paolantonio, Seattle, WA (US); Christian Klein, Duvall, WA (US); Oscar Murillo, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 270 days.

(21) Appl. No.: 14/151,744

(22) Filed: Jan. 9, 2014

(65) Prior Publication Data
US 2015/0193107 A1 Jul. 9, 2015

(51) Int. Cl.
| | | |
|---|---|---|
| *G06F 3/048* | (2013.01) | |
| *G06F 3/0485* | (2013.01) | |
| *G06F 3/01* | (2006.01) | |
| *G06F 3/03* | (2006.01) | |
| *G06K 9/00* | (2006.01) | |
| *G06F 3/0484* | (2013.01) | |

(52) U.S. Cl.
CPC ............ *G06F 3/0485* (2013.01); *G06F 3/013* (2013.01); *G06F 3/017* (2013.01); *G06F 3/0304* (2013.01); *G06F 3/04842* (2013.01); *G06K 9/00355* (2013.01); *G06F 2203/0381* (2013.01); *G06F 2203/04806* (2013.01)

(58) Field of Classification Search
None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |

(Continued)

FOREIGN PATENT DOCUMENTS

| | | |
|---|---|---|
| CN | 101254344 A | 9/2008 |
| EP | 0583061 A2 | 2/1994 |

(Continued)

OTHER PUBLICATIONS

"Kinect for Windows—Human Interface Guidelines v1.7", Microsoft, http://download.microsoft.com/download/B/0/7/B070724E-52B4-4B1A-BD1B-05CC28D07899/Human_Interface_Guidelines_v1.7.0.pdf, Available as early as Jul. 23, 2013, 135 pages.

(Continued)

*Primary Examiner* — William C Trapanese
(74) *Attorney, Agent, or Firm* — Alleman Hall Creasman & Tuttle LLP

(57) ABSTRACT

A method to decode natural user input from a human subject. The method includes detection of a gesture and concurrent grip state of the subject. If the grip state is closed during the gesture, then a user-interface (UI) canvas of the computer system is transformed based on the gesture. If the grip state is open during the gesture, then a UI object arranged on the UI canvas is activated based on the gesture.

17 Claims, 9 Drawing Sheets

(56) References Cited

U.S. PATENT DOCUMENTS

| | | |
|---|---|---|
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,222,465 B1 * | 4/2001 | Kumar ............... G06F 3/017 341/20 |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,646,394 B1 | 1/2010 | Neely, III et al. |
| 7,668,340 B2 | 2/2010 | Cohen et al. |

(56) References Cited

U.S. PATENT DOCUMENTS

| | | | |
|---|---|---|---|
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,457,353 B2 | 6/2013 | Reville et al. | |
| 2007/0110298 A1 | 5/2007 | Graepel et al. | |
| 2007/0259717 A1 | 11/2007 | Mattice et al. | |
| 2008/0013826 A1 | 1/2008 | Hillis et al. | |
| 2008/0026838 A1 | 1/2008 | Dunstan et al. | |
| 2008/0040692 A1 | 2/2008 | Sunday et al. | |
| 2009/0103780 A1 | 4/2009 | Nishihara et al. | |
| 2009/0228841 A1* | 9/2009 | Hildreth | G06F 3/0304 715/863 |
| 2010/0295781 A1 | 11/2010 | Alameh et al. | |
| 2012/0013529 A1 | 1/2012 | McGibney et al. | |
| 2012/0030569 A1 | 2/2012 | Migos et al. | |
| 2012/0069168 A1* | 3/2012 | Huang | G06F 3/017 348/77 |
| 2013/0038601 A1 | 2/2013 | Han et al. | |

FOREIGN PATENT DOCUMENTS

| | | |
|---|---|---|
| JP | H08044490 A | 2/1996 |
| KR | 20100121420 A | 11/2010 |
| TW | 543323 B | 7/2003 |
| WO | 9310708 A1 | 6/1993 |
| WO | 9717598 A1 | 5/1997 |
| WO | 9944698 A2 | 9/1999 |

OTHER PUBLICATIONS

Song, Peng et al., "A Handle Bar Metaphor for Virtual Object Manipulation with Mid-Air Interaction", Proceedings of the ACM Annual Conference on Human Factors in Computing Systems, May 5, 2012, 10 pages.
Vbandi, "Kinect Interactions with WPF—Part I: Getting Started", Dotneteers.net, http://dotneteers.net/blogs/vbandi/archive/2013/03/25/kinect-interactions-with-wpf-part-i-getting-started.aspx, Published Mar. 25, 2013, Accessed Apr. 7, 2014, 19 pages.
Fisher, S. et al., "Virtual Environment Display System," ACM 1986 Workshop on Interactive 3D Graphics, Oct. 23, 1986, 12 pages.
Azarbayejani, A. et al., "Visually Controlled Graphics," IEEE Transactions on Pattern Analysis and Machine Intelligence, vol. 15, No. 6, Jun. 1993, 4 pages.
Sheridan, T. et al., "Virtual Reality Check," Technology Review, vol. 96, No. 7, Oct. 1993, 9 pages.
"Simulation and Training," Division Incorporated, Available as Early as Jan. 1, 1994, 6 pages.
Granieri, J. et al., "Simulating Humans in VR," Conference of the British Computer Society, Oct. 12, 1994, 15 pages.
Freeman, W. et al., "Television Control by Hand Gestures," Technical Report TR94-24, Mitsubishi Electric Research Laboratories, Dec. 1994, 7 pages.
Breen, D. et al., "Interactive Occlusion and Collision of Real and Virtual Objects in Augmented Reality," Technical Report ECRC-95-02, European Computer-Industry Research Center GmbH, Available as Early as Jan. 1, 1995, 22 pages.

Stevens, J., "Flights Into Virtual Reality Treating Real World Disorders," The Washington Post, Science Psychology, Mar. 27, 1995, 2 pages.
"Virtual High Anxiety," Popular Mechanics, vol. 172, No. 8, Aug. 1995, 1 page.
Kanade, T. et al., "A Stereo Machine for Video-rate Dense Depth Mapping and Its New Applications," IEEE Computer Society Conference on Computer Vision and Pattern Recognition, Jun. 1996, 7 pages.
Kohler, M., "Vision Based Remote Control in Intelligent Home Environments," Proceedings of 3D Image Analysis and Synthesis 1996, Nov. 1996, 8 pages.
Bowman, D., "An Evaluation of Techniques for Grabbing and Manipulating Remote Objects in Immersive Virtual Environments," Proceedings of the 1997 symposium on Interactive 3D graphics (I3D '97), Apr. 27, 1997, Providence, Rhode Island, 4 pages.
Aggarwal, J. et al., "Human Motion Analysis: A Review," Proceedings of IEEE Nonrigid and Articulated Motion Workshop 1997, Jun. 1997, 13 pages.
Kohler, M., "Techical Details and Ergonomical Aspects of Gesture Recognition applied in Intelligent Home Environments," Technical University of Dortmund, Germany, Jun. 1997, 35 pages.
Pavlovic, V. et al., "Visual Interpretation of Hand Gesture for Human-Computer Interaction: A Review," IEEE Transactions on Pattern Analysis and Machine Intelligence, vol. 19, No. 7, Jul. 1997, 19 pages.
Wren, C. et al., "Pfinder: Real-Time Tracking of the Human Body," IEEE Transactions on Pattern Analysis and Machine Intelligence, vol. 19, No. 7, Jul. 1997, 6 pages.
Kohler, M., "Special Topics of Gesture Recognition Applied in Intelligent Home Environments," Proceedings of International Gesture Workshop, Sep. 1997, 12 pages.
Miyagawa, R. et al., "CCD-Based Range-Finding Sensor," IEEE Transactions on Electron Devices, vol. 44, No. 10, Oct. 1997, 5 pages.
Shao, J. et al., "An Open System Architecture for a Multimedia and Multimodal User Interface," Improving the Quality of Life for the European Citizen, TIDE 98, Jan. 1998, 8 pages.
Isard, M. et al., "Condensation—Conditional Density Propagation for Visual Tracking," International Journal of Computer Vision, vol. 29, No. 1, Aug. 1998, 24 pages.
Brogan, D. et al., "Dynamically Simulated Characters in Virtual Environments," IEEE Computer Graphics and Applications, vol. 18, No. 5, Sep. 1998, 12 pages.
Livingston, M., "Vision-based Tracking with Dynamic Structured Light for Video See-through Augmented Reality," Doctoral Dissertation, University of North Carolina at Chapel Hill, Dec. 1998, 145 pages.
Hongo, H. et al., "Focus of Attention for Face and Hand Gesture Recognition Using Multiple Cameras," Proceedings of the 4th Annual IEEE Conference on Automatic Face and Gesture Recognition, Mar. 2000, 6 pages.
Zhao, L., "Dressed Human Modeling, Detection, and Parts Localization," Doctoral Dissertation, The Robotics Institute, Carnegie Mellon University, Jul. 26, 2001, 121 pages.
Leikas, J. et al., "Virtual Space Computer Games with a Floor Sensor Control: Human Centered Approach in the Design Process," Proceedings of the First International Workshop on Haptic Human-Computer Interaction, Aug. 31, 2000, Glasgow, United Kingdom, 4 pages.
Qian, G. et al., "A Gesture-Driven Multimodal Interactive Dance System," 2004 IEEE International Conference on Multimedia and Expo, ICME 04, Jul. 2004, 4 pages.
He, L., "Generation of Human Body Models," Master's Thesis, University of Auckland, Apr. 2005, 111 pages.
Rosenhahn, B. et al., "Automatic Human Model Generation," Proceedings of the 11th International Conference of CAIP, Sep. 2005, 8 pages.
Hasegawa, S. et al., "Human-Scale Haptic Interaction with a Reactive Virtual Human in a Real-Time Physics Simulator," ACM Computers in Entertainment, vol. 4, No. 3, Article 6C, Jul. 2006, 12 pages.

(56) References Cited

OTHER PUBLICATIONS

Valli, A., "Natural Interaction White Paper," Natural Interaction Website, Available Online at https://web.archive.org/web/20091007115641/http://www.naturalinteraction.org/images/whitepaper.pdf, as last updated Sep. 2007, 21 pages.

Takase, H. et al. "Gestural Interface and the Intuitive Interaction with Virtual Objects," Proceedings of the 2009 ICROS-SICE International Joint Conference (ICCAS-SICE 2009), Aug. 18, 2009, Fukuoka, Japan, 4 pages.

State Intellectual Property Office of the People's Republic of China, First Office Action Issued in Application No. 201110430789.0, dated Feb. 24, 2014, 6 pages.

State Intellectual Property Office of the People's Republic of China, Second Office Action Issued in Application No. 201110430789.0, dated Jul. 21, 2014, 17 pages.

State Intellectual Property Office of the People's Republic of China, Third Office Action Issued in Application No. 201110430789.0, dated Jan. 30, 2015, 7 pages.

\* cited by examiner

GESTURE LIBRARY FOR NATURAL USER INPUT

BACKGROUND

Natural user-input (NUI) technologies aim to provide intuitive modes of interaction between computer systems and human beings. Such modes may include posture, gesture, gaze, and/or speech recognition, as examples. Increasingly, a suitably configured vision and/or listening system may replace or augment traditional user-interface hardware, such as a keyboard, mouse, touch screen, gamepad, or joystick controller.

In video gaming, for example, a vision system may be configured to observe and recognize the postures and/or gestures of a player, and thereby control the in-game actions of that player. It is typically not the case, however, for a common set of gestures to be recognized across different applications, including the operating-system shell of the computer system. As a consequence, a user may be burdened with having to learn and perform numerous, application-specific variants of common gestures and to use them in the appropriate context. Failure to do so may result in a frustrating user experience, as variation in a recognized gesture from one application to the next may yield unexpected results during program execution.

SUMMARY

One embodiment of this disclosure provides a method to decode natural user input from a human subject. The method includes detection of a gesture and concurrent grip state of the subject. If the grip state is closed during the gesture, then a user-interface (UI) canvas of the computer system is transformed based on the gesture. If the grip state is open during the gesture, then a UI object arranged on the UI canvas is activated based on the gesture.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
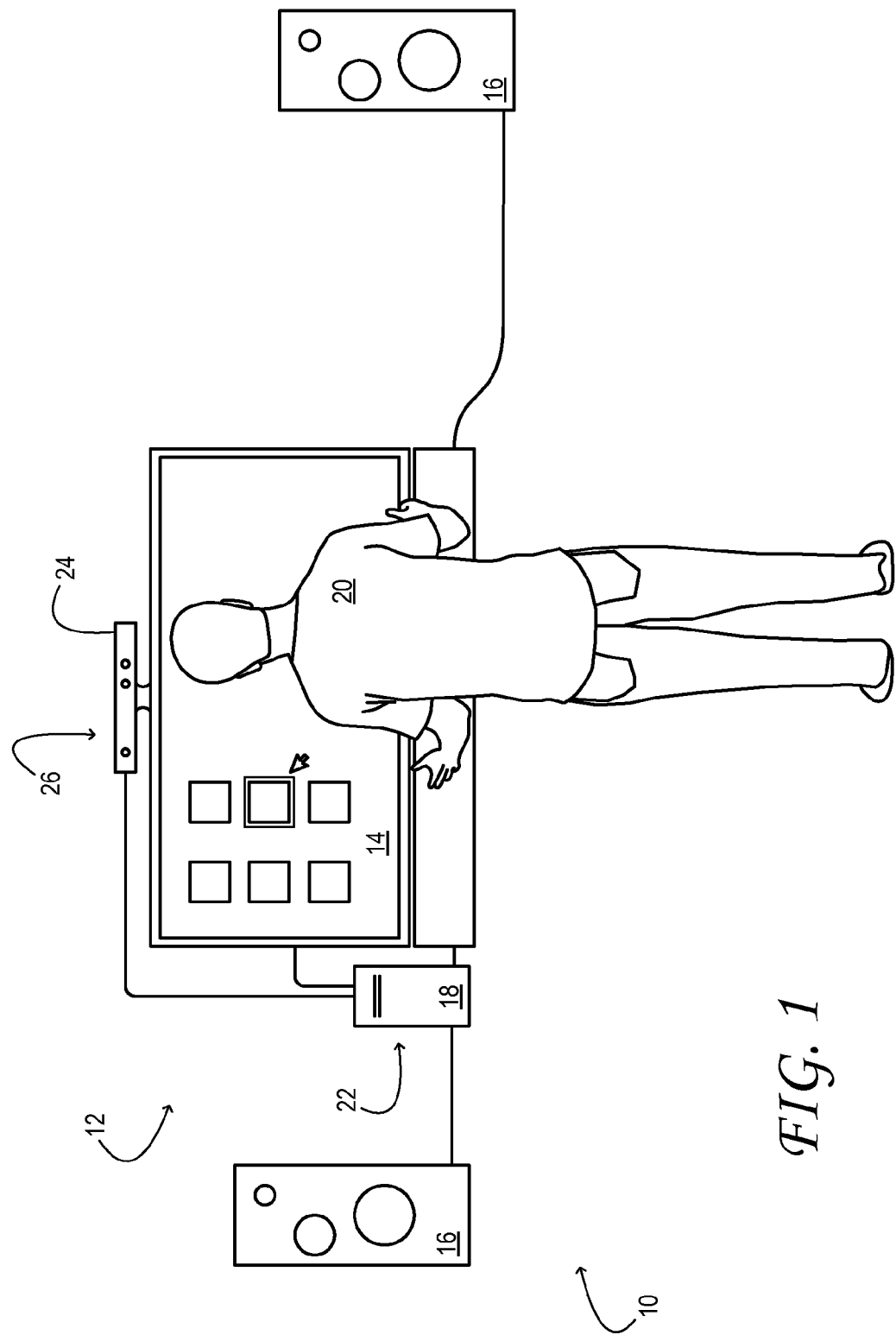
FIG. 1 shows aspects of an example environment in which NUI is used to control a computer system, in accordance with an embodiment of this disclosure.

Aspects of this disclosure will now be described by example and with reference to the illustrated embodiments listed above. Components, process steps, and other elements that may be substantially the same in one or more embodiments are identified coordinately and described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example environment 10. The illustrated environment is a living room or family room of a personal residence. However, the approaches described herein are equally applicable in other environments, such as retail stores and kiosks, restaurants, information and public-service kiosks, etc.

The environment of FIG. 1 features a home-entertainment system 12. The home-entertainment system includes a large-format display 14 and loudspeakers 16, both operatively coupled to computer system 18. In other embodiments, such as near-eye display variants, the display may be installed in headwear or eyewear worn by a user of the computer system.

In some embodiments, computer system 18 may be a video-game system. In some embodiments, computer system 18 may be a multimedia system configured to play music and/or video. In some embodiments, computer system 18 may be a general-purpose computer system used for internet browsing and productivity applications—word processing and spreadsheet applications, for example. In general, computer system 18 may be configured for any or all of the above purposes, among others, without departing from the scope of this disclosure.

Computer system 18 is configured to accept various forms of user input from one or more users 20. As such, traditional user-input devices such as a keyboard, mouse, touch-screen, gamepad, or joystick controller (not shown in the drawings) may be operatively coupled to the computer system. Regardless of whether traditional user-input modalities are supported, computer system 18 is also configured to accept so-called natural user input (NUI) from at least one user. In the scenario represented in FIG. 1, user 20 is shown in a standing position; in other scenarios, a user may be seated or lying down, again without departing from the scope of this disclosure.

To mediate NUI from the one or more users, NUI system 22 is part of computer system 18. The NUI system is configured to capture various aspects of the NUI and provide corresponding actionable input to the computer system. To this end, the NUI system receives low-level input from peripheral sensory components, which include vision system 24 and listening system 26. In the illustrated embodiment, the vision system and listening system share a common enclosure; in other embodiments, they may be separate components. In still other embodiments, the vision, listening and NUI systems may be integrated within the computer system. The computer system and the vision system may be coupled via a wired communications link, as shown in the drawing, or in any other suitable manner. Although FIG. 1 shows the sensory components arranged atop display 14, various other arrangements are contemplated as well. The vision system could be mounted on a ceiling, for example.

Figure 2:
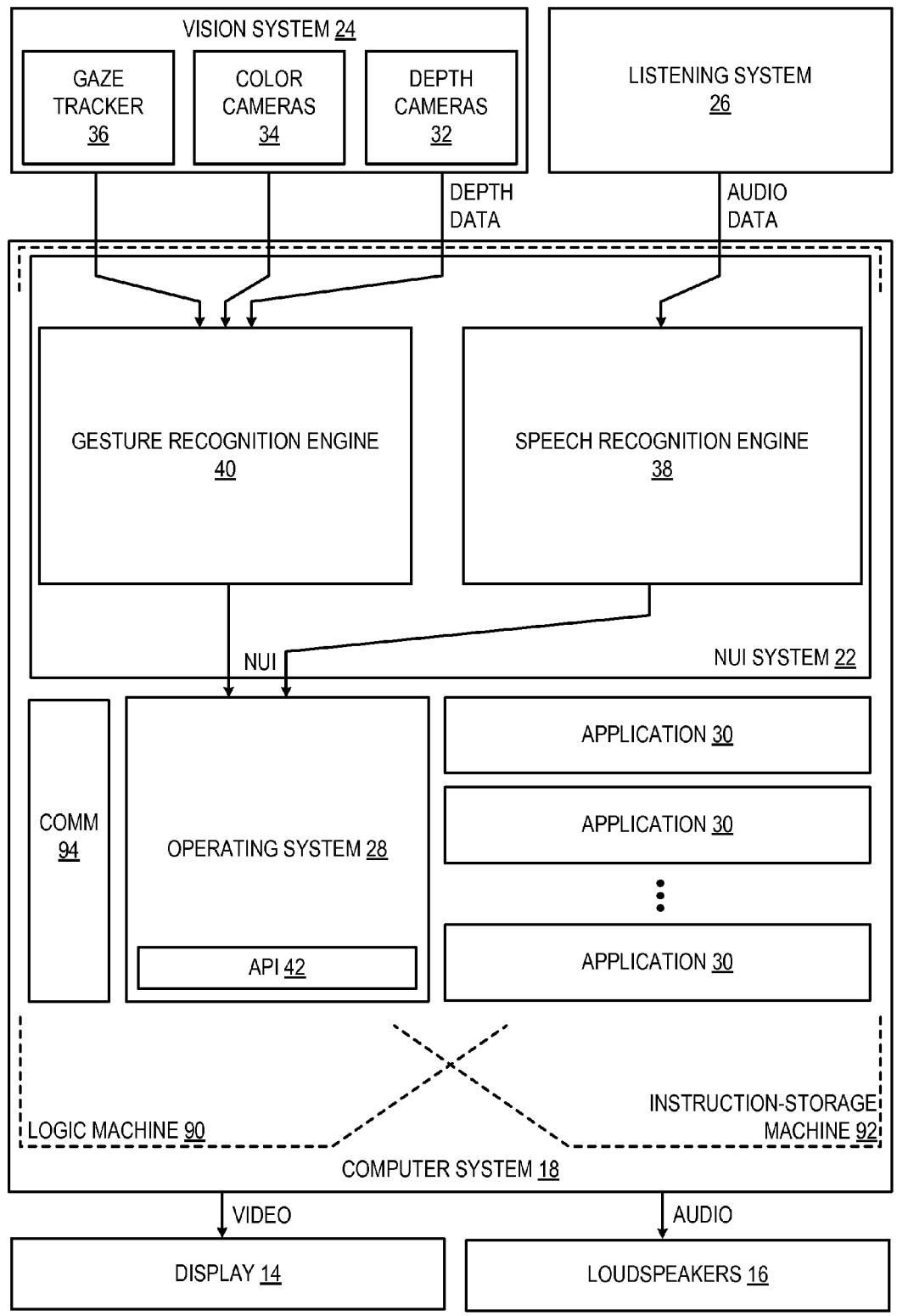
FIG. 2 shows aspects of a computer system, NUI system, vision system, and listening system, in accordance with an embodiment of this disclosure.

FIG. 2 is a high-level schematic diagram showing aspects of computer system 18, NUI system 22, vision system 24, and listening system 26, in one example embodiment. The illustrated computer system includes operating system (OS) 28, which may be instantiated in software and/or firmware. The computer system also includes one or more applications 30, such as a video-game application, a digital-media player, an internet browser, a photo editor, a word processor, and/or a spreadsheet application, for example. Naturally, the computer, NUI, vision, and/or listening systems may also include suitable data-storage, instruction-storage, and logic hardware, as needed to support their respective functions.

Listening system 26 may include one or more microphones to pick up vocalization and other audible input from one or more users and other sources in environment 10; vision system 24 detects visual input from the users. In the illustrated embodiment, the vision system includes one or more depth cameras 32, one or more color cameras 34, and a gaze tracker 36. In other embodiments, the vision system may include more or fewer components. NUI system 22 processes low-level input (i.e., signal) from these sensory components to provide actionable, high-level input to computer system 18. For example, the NUI system may perform sound- or voice-recognition on an audio signal from listening system 26. Such recognition may generate corresponding text-based or other high-level commands, which are received in the computer system.

Continuing in FIG. 2, each depth camera 32 may include an imaging system configured to acquire a time-resolved sequence of depth maps of one or more human subjects that it sights. As used herein, the term 'depth map' refers to an array of pixels registered to corresponding regions ($X_i$, $Y_i$) of an imaged scene, with a depth value $Z_i$ indicating, for each pixel, the depth of the corresponding region. 'Depth' is defined as a coordinate parallel to the optical axis of the depth camera, which increases with increasing distance from the depth camera. Operationally, a depth camera may be configured to acquire two-dimensional image data from which a depth map is obtained via downstream processing.

In general, the nature of depth cameras 32 may differ in the various embodiments of this disclosure. For example, a depth camera can be stationary, moving, or movable. Any non-stationary depth camera may have the ability to image an environment from a range of perspectives. In one embodiment, brightness or color data from two, stereoscopically oriented imaging arrays in a depth camera may be co-registered and used to construct a depth map. In other embodiments, a depth camera may be configured to project onto the subject a structured infrared (IR) illumination pattern comprising numerous discrete features—e.g., lines or dots. An imaging array in the depth camera may be configured to image the structured illumination reflected back from the subject. Based on the spacings between adjacent features in the various regions of the imaged subject, a depth map of the subject may be constructed. In still other embodiments, the depth camera may project a pulsed infrared illumination towards the subject. A pair of imaging arrays in the depth camera may be configured to detect the pulsed illumination reflected back from the subject. Both arrays may include an electronic shutter synchronized to the pulsed illumination, but the integration times for the arrays may differ, such that a pixel-resolved time-of-flight of the pulsed illumination, from the illumination source to the subject and then to the arrays, is discernible based on the relative amounts of light received in corresponding elements of the two arrays. Depth cameras 32, as described above, are naturally applicable to observing people. This is due in part to their ability to resolve a contour of a human subject even if that subject is moving, and even if the motion of the subject (or any part of the subject) is parallel to the optical axis of the camera. This ability is supported, amplified, and extended through the dedicated logic architecture of NUI system 22.

When included, each color camera 34 may image visible light from the observed scene in a plurality of channels—e.g., red, green, blue, etc.—mapping the imaged light to an array of pixels. Alternatively, a monochromatic camera may be included, which images the light in grayscale. Color or brightness values for all of the pixels exposed in the camera constitute collectively a digital color image. In one embodiment, the depth and color cameras used in environment 10 may have the same resolutions. Even when the resolutions differ, the pixels of the color camera may be registered to those of the depth camera. In this way, both color and depth information may be assessed for each portion of an observed scene.

It will be noted that the sensory data acquired through NUI system 22 may take the form of any suitable data structure, including one or more matrices that include X, Y, Z coordinates for every pixel imaged by the depth camera, and red, green, and blue channel values for every pixel imaged by color camera, in addition to time resolved digital audio data from listening system 26.

As shown in FIG. 2, NUI system 22 includes a speech-recognition engine 38 and a gesture-recognition engine 40. The speech-recognition engine is configured to process the audio data from listening system 26, to recognize certain words or phrases in the user's speech, and to generate corresponding actionable input to OS 28 or applications 30 of computer system 18. The gesture-recognition engine is configured to process at least the depth data from vision system 24, to identify one or more human subjects in the depth data, to compute various skeletal features of the subjects identified, and to gather from the skeletal features the various postural or gestural information used as NUI to the OS or applications. These functions of the gesture-recognition engine are described hereinafter, in greater detail.

Continuing in FIG. 2, a gesture-recognition application-programming interface (API) 42 is included in OS 28 of computer system 18. This API offers callable code to provide actionable input for a plurality of processes running on the computer system based on a subject's input gesture. Such processes may include application processes, OS processes, and service processes, for example. In one embodiment, the gesture-recognition API may be distributed in a software-development kit (SDK) provided to application developers by the OS maker.

In the various embodiments contemplated herein, some or all of the recognized input gestures may include gestures of the hands. In some embodiments, the hand gestures may be performed in concert or in series with an associated body gesture. One embodiment provides a root library of recognized hand gestures and associated actionable input. Such actionable input may include any or all of the following: (a) input to signal engagement of a human subject as a user of the computer system; (b) input to signal disengagement of a human subject as a user of the computer system; (c) input to signal user manipulation of a UI canvas of the computer system; (d) input to return to an OS shell of the computer system from a currently running application or game; (e) input to open or expand a UI element—such as a notification—presented on the display; and (f) input to signal user activation of a UI element arranged on the UI canvas. The root library may include other input as well, and may in some embodiments be part of an extensible library system.

Figure 3:
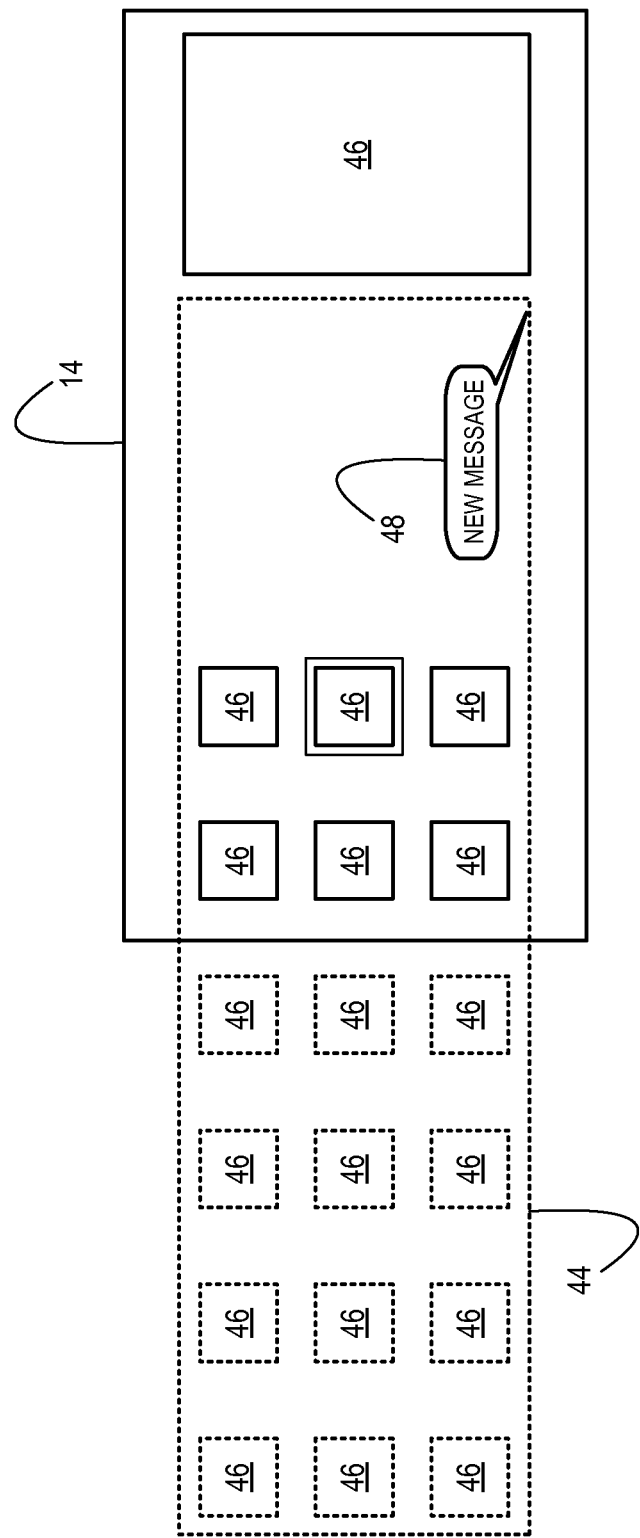
FIG. 3 shows aspects of an example UI canvas in accordance with an embodiment of this disclosure.

As used herein, the term 'UI canvas' refers to a portion of a display screen on which two or more UI elements—icons, tiles, check boxes, radio buttons, notifications, etc.—are arranged. Aspects of an example UI canvas 44 are shown in FIG. 3. In the illustrated embodiment, a plurality of tiles 46 are arranged on the UI canvas, in addition to a notification 48. In some scenarios, a UI canvas may be longer and/or wider than the display screen. As such, some of the included UI elements may be hidden from the user at a given time, but may be brought into view by scrolling (vertically), panning (horizontally or diagonally), or zooming in or out. Collectively, the actions of scrolling, panning, and zooming—both out and in—are called 'UI canvas transformations' or 'UI canvas manipulations' herein.

Figure 4:
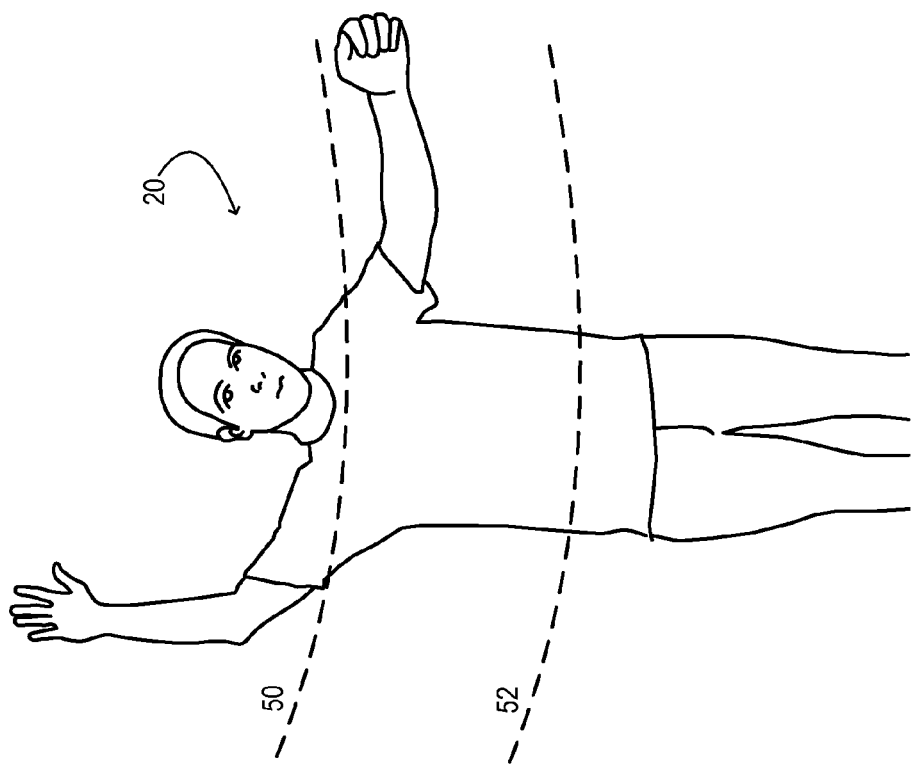
FIG. 4 shows aspects of an engagement gesture in accordance with an embodiment of this disclosure.

In one embodiment, the input (a) to signal engagement of a human subject as a user of the computer system is provided upon detection of a raised hand and open palm of the subject, presented facing display 14 or vision system 24. FIG. 4 illustrates one example of this gesture. The drawing also shows a pre-defined threshold level 50 over which the hand may be raised to ensure detection of the engagement gesture. The level of the threshold may be specified relative to the field of view of vision system 26, in some examples, or relative to the subject's height or other body metric in other examples. Naturally, the particular level shown in FIG. 4 is in no way limiting. In other examples, more complex zones of interaction may be defined in terms of a plurality of thresholds, via fuzzy-logic principles, or heuristically.

In this and other embodiments, the input (b) to signal disengagement of the subject as a user of the computer system may be provided upon detection of the active hand of the subject dropping below another pre-defined threshold level 52 (referring still to FIG. 4), which delimits an ergonomically comfortable zone of interaction for the user. In particular, the hands dropping below the subject's rib cage, below the subject's waist, etc., may signal disengagement, while other levels may be used instead.

Figure 5:
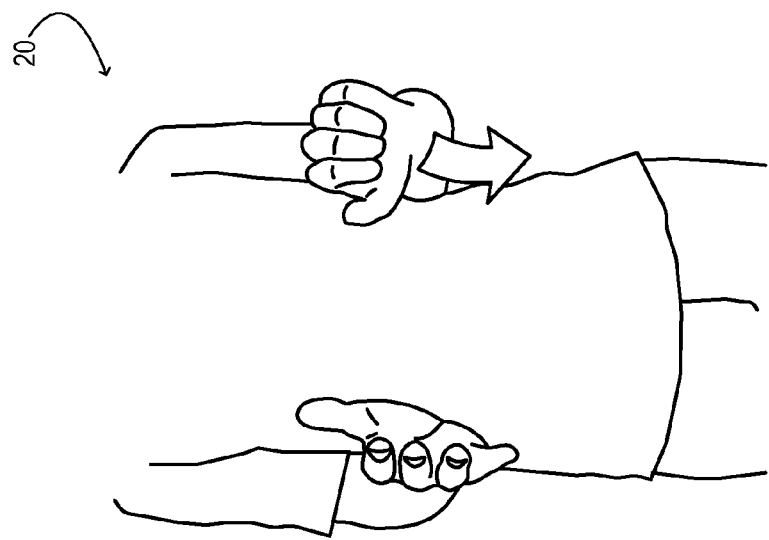
FIG. 5 shows aspects of a scroll gesture in accordance with an embodiment of this disclosure.
Figure 7:
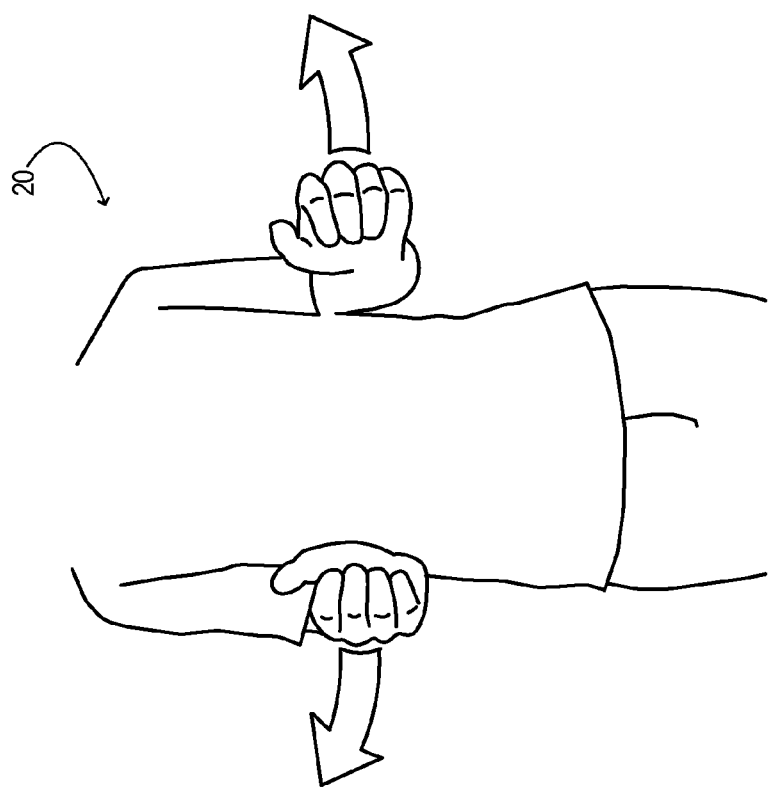
FIG. 7 shows aspects of stretch or zoom-in gesture in accordance with an embodiment of this disclosure.
Figure 6:
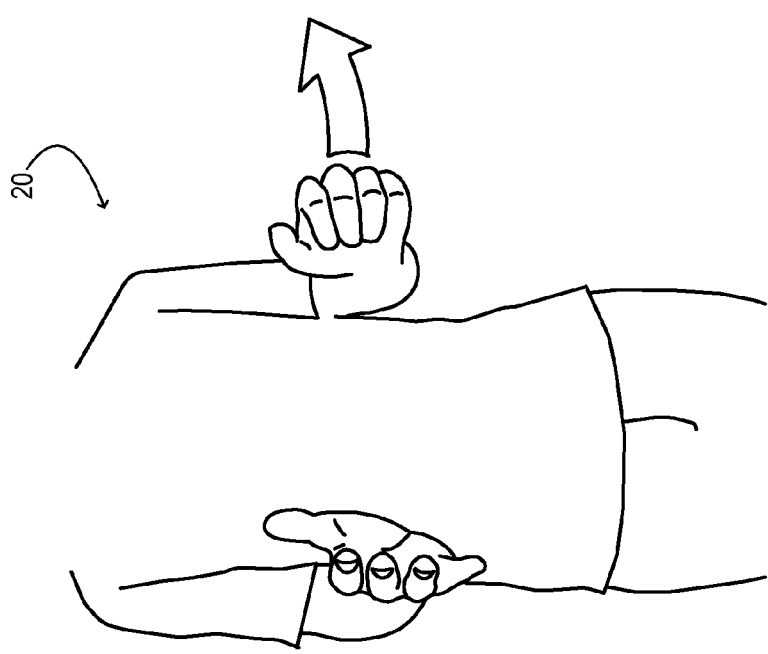
FIG. 6 shows aspects of a pan gesture in accordance with an embodiment of this disclosure.
Figure 8:
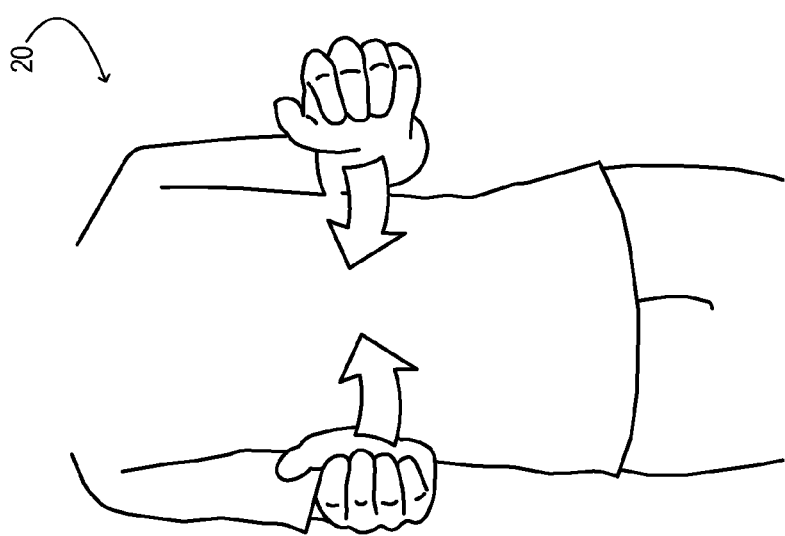
FIG. 8 shows aspects of a compression or zoom-out gesture in accordance with an embodiment of this disclosure.

In this and other embodiments, the input (c) to signal user manipulation of the UI canvas may be provided upon detection in the vision system of a closed-hand gesture, in general. As noted above, several different kinds of UI canvas manipulations are envisaged herein, which may be signaled each by an associated closed-hand gesture. For example, vertical scrolling of the canvas may be signaled by a pulling-down or pushing-up motion of one or both closed hands, as shown in FIG. 5. Horizontal or diagonal panning of the canvas may be signaled by a sweeping motion of one or both closed hands, as shown in FIG. 6. The action of zooming in on the UI canvas may be signaled by a two-handed stretch gesture with both hands closed, as shown in FIG. 7. Likewise, the action of zooming out on the UI canvas may be signaled by a two-handed compression gesture with both hands closed, as shown in FIG. 8. The drawings should not be interpreted in a limiting sense, however, as variants of the illustrated zoom gestures are recognized as well. For example, zoom gestures may be enacted with only one hand moving and the other hand held fixed, or in other scenarios may require the motion of both hands. In some embodiments, a user-preferred style or dialect of a given hand gesture may be recorded and assigned to a user ID or profile. Gesture detection may proceed with user-preferred dialects given priority over generic, or factory-defined dialects. This approach can reduce the occurrence of false-positive detection of overloaded gestures, as described below.

In these and other embodiments, the input (d) to return to a shell of the OS from a currently running application may be provided upon detection of a two-handed compression (or zoom-out) gesture by the subject, which may be the same or similar to the gesture shown in FIG. 8. Furthermore, the input (e) to open or expand a UI element may be provided upon detection of a two-handed stretch (or zoom-in) gesture, the same or similar—in some embodiments—to the gesture shown in FIG. 7. Accordingly, some of the recognized gestures in the root library may be intentionally 'overloaded.' In such embodiments, a suitable disambiguation strategy (vide infra) may be used to ensure that an overloaded gesture is recognized appropriately—i.e., according to context.

Figure 9:
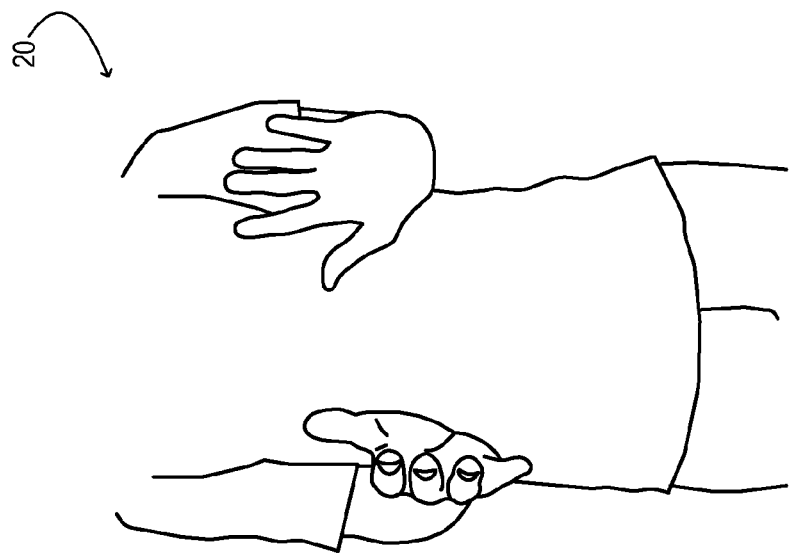
FIG. 9 shows aspects of a push gesture in accordance with an embodiment of this disclosure.

Continuing, the input (f) to signal user activation of a UI element may be provided upon detection in the vision system of a one-handed push gesture by the subject, as shown in FIG. 9. In one example, the one-handed push gesture may include a press action in which the open hand moves forward (away from the subject's body) followed by a release action in which the still-open hand moves back towards the subject's body. By requiring both press and release, the input to signal user activation of the UI element may be distinguished from an otherwise similar press-and-hold gesture, which may correspond to different input. For example, a press-and-hold gesture may invoke a context-sensitive menu of commands, similar in some respects to the right-click event of a conventional mouse. In some embodiments and scenarios, the UI element to be activated is selected by the user in advance of activation. In more particular embodiments and scenarios, such selection may be received from the user through NUI. To this end, gesture-recognition engine 40 may be configured to relate (i.e., map) a metric from user's posture to screen coordinates on display 14. For example, the position of the user's right hand may be used to compute 'mouse-pointer' coordinates. Feedback to the user may be provided by presentation of a mouse-pointer graphic on the display screen at the computed coordinates. In some examples and usage scenarios, selection focus among the various UI elements presented on the display screen may be awarded based on proximity to the computed mouse-pointer coordinates. It will be noted that use of the terms 'mouse-pointer' and 'mouse-pointer coordinates' does not require the use of a physical mouse, and the pointer graphic may have virtually any visual appearance—e.g., a graphical hand).

One example of the mapping noted above is represented visually in FIG. 10, which also shows an example mouse pointer 54. Here, the user's right hand moves within an interaction zone 56. The position of the centroid of the right hand may be tracked via gesture-recognition engine 40 in any suitable coordinate system—e.g., relative to a coordinate system fixed to the user's torso, as shown in the drawing. This approach offers an advantage in that the mapping can be made independent of the user's orientation relative to vision system 24 or display 14. Thus, in the illustrated example, the gesture-recognition engine is configured to map coordinates of the user's right hand in the interaction zone—(r, α, β) in FIG. 10—to coordinates (X, Y) in the plane of the display. In one embodiment, the mapping may involve projection of the hand coordinates (X', Y', Z'), in the frame of reference of the interaction zone, onto a vertical plane parallel to the user's shoulder-to-shoulder axis. The projection is then scaled appropriately to arrive at the display coordinates (X, Y). In other embodiments, the projection may take into account the natural curvature of the user's hand trajectory as the hand is swept horizontally or vertically in front of the user's body. In other words, the projection may be onto a curved surface rather than a plane, and then flattened to arrive at the display coordinates. In either case, the UI element whose coordinates most closely match the computed mouse-pointer coordinates is awarded selection focus. This UI element then may be activated via a push gesture, as described above. In some examples, the same type of mapping may be used to register the user's hand positions during a canvas-manipulation, engagement, or disengagement gesture. Naturally, the same type of mapping may be used for the left hand as well as the right.

Figure 10:
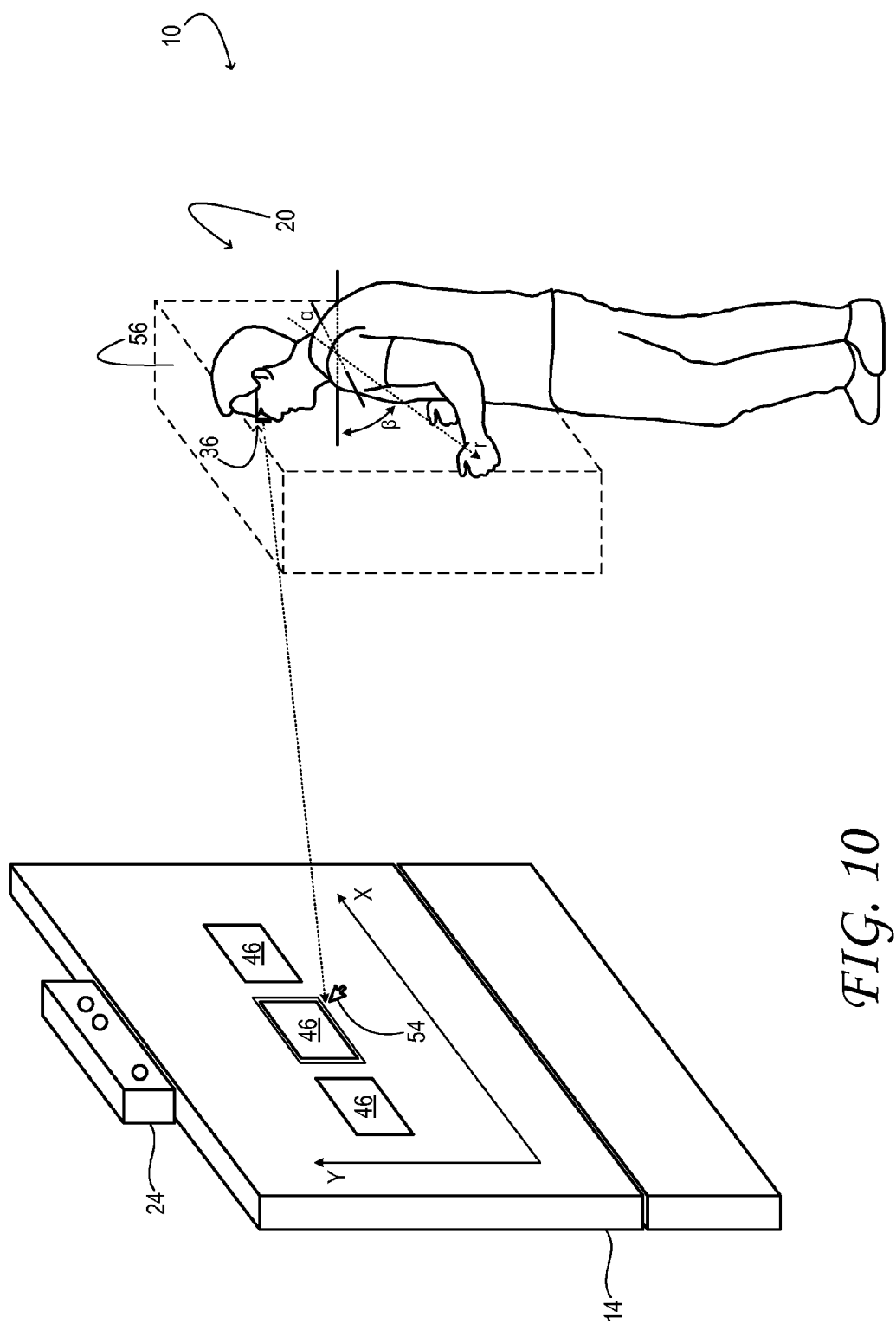
FIG. 10 illustrates the mapping of a subject's hand position and or gaze direction to mouse-pointer coordinates on a display screen, in accordance with an embodiment of this disclosure.

In this and other embodiments, NUI system 22 may be configured to provide alternative mappings between a user's hand gestures and the computed mouse-pointer coordinates. For instance, the NUI system may simply estimate the locus on display 14 that the user is pointing to. Such an estimate may be made based on hand position and/or position of the fingers. In still other embodiments, the user's focal point or gaze direction may be used as a parameter from which to compute the mouse-pointer coordinates. In FIG. 10, accordingly, a gaze tracker 36 is shown being worn over the user's eyes. The user's gaze direction may be determined and used in lieu of hand position to compute the mouse-pointer coordinates that enable UI-object selection.

No aspect of the above description or drawings should be interpreted in a limiting sense, for numerous other embodiments lie fully within the spirit and scope of this disclosure. For example, display of a mouse-pointer graphic is only one possible mode of providing visual feedback based on selection locus. Other possible modes include highlighting the UI element nearest the selection locus, or presenting a context-sensitive menu adjacent the UI element nearest the selection locus. In some embodiments, such visual feedback may be used in conjunction with audible feedback, so that the user is adequately informed which UI element is liable to be activated. In these and other embodiments, the visual and/or audible feedback may be coordinated with multiple stages of an activation or system gesture to ensure that the user can 'back out' of a gesture that he or she has begun but does not wish to complete. As one non-limiting example, a push gesture used for activation may be broken up into stages, such as a hover stage and a thrust stage. A certain level of feedback may be provided when the user's hand position causes the mouse pointer to hover over an activation-enabled UI element. This feedback alerts the user that activation of that UI element is imminent and will be completed upon detection of a thrust with the same hand. A user not wanting to complete the activation can simply move that hand without thrusting it forward.

The configurations described above enable various methods to decode NUI from a user of a computer system. Some such methods are now described, by way of example, with continued reference to the above configurations. It will be understood, however, that the methods here described, and others within the scope of this disclosure, may be enabled by different configurations as well. The methods herein, which involve the observation of people in their daily lives, may and should be enacted with utmost respect for personal privacy. Accordingly, the methods presented herein are fully compatible with opt-in participation of the persons being observed. In embodiments where personal data is collected on a local system and transmitted to a remote system for processing, that data can be anonymized. In other embodiments, personal data may be confined to a local system, and only non-personal, summary data transmitted to a remote system.

Figure 11:
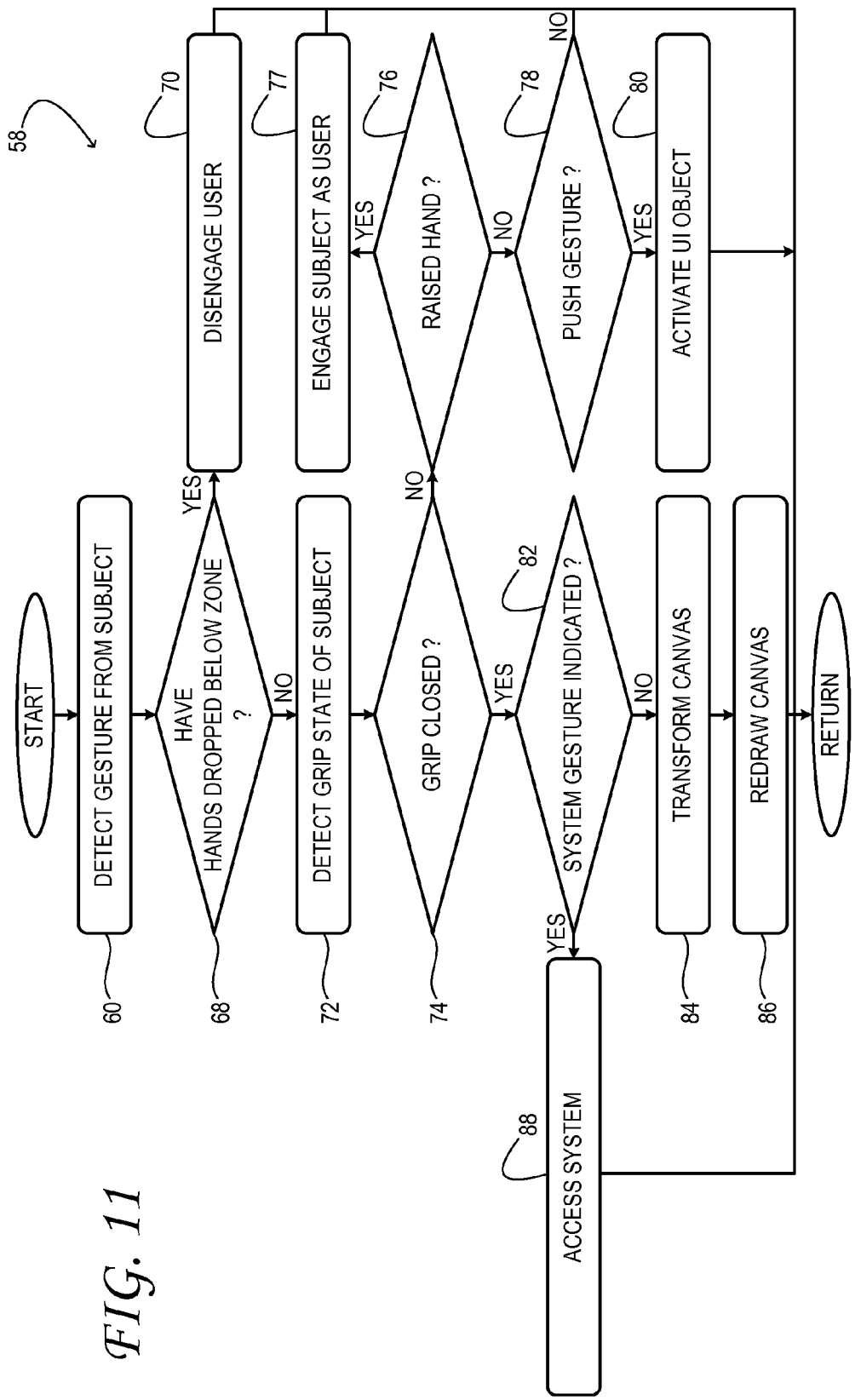
FIG. 11 illustrates an example method to decode NUI, in accordance with an embodiment of this disclosure.

FIG. 11 illustrates an example method 58 to be enacted in a computer system operatively coupled to a vision system, such as vision system 24. The illustrated method is a way to decode natural user input (NUI) from a user of the computer system.

At 60 of method 58 a gesture from a human subject is detected. In some embodiments, this gesture may be defined at least partly in terms of a position of a hand of the subject with respect to the subject's body. Such gestures may include one- or two-handed hand gestures, for example, in some cases coupled with an associated body movement.

Gesture detection is a complex process that admits of numerous variants. For ease of explanation, one example variant will now be described. Gesture detection may begin when depth data is received in NUI system 22 from vision system 26. In some embodiments, such data may take the form of a raw data stream—e.g., a video or depth-video stream. In other embodiments, the data already may have been processed to some degree within the vision system. Through subsequent actions, the data received in the NUI system is further processed to detect various states or conditions that constitute user input to computer system 18, as further described below.

Continuing, at least a portion of one or more human subjects may be identified in the depth data by NUI system 22. Through appropriate depth-image processing, a given locus of a depth map may be recognized as belonging to a human subject. In a more particular embodiment, pixels that belong to a human subject are identified by sectioning off a portion of the depth data that exhibits above-threshold motion over a suitable time scale, and attempting to fit that section to a generalized geometric model of a human being. If a suitable fit can be achieved, then the pixels in that section are recognized as those of a human subject. In other embodiments, human subjects may be identified by contour alone, irrespective of motion.

In one, non-limiting example, each pixel of a depth map may be assigned a person index that identifies the pixel as belonging to a particular human subject or non-human element. As an example, pixels corresponding to a first human subject can be assigned a person index equal to one, pixels corresponding to a second human subject can be assigned a person index equal to two, and pixels that do not correspond to a human subject can be assigned a person index equal to zero. Person indices may be determined, assigned, and saved in any suitable manner.

After all the candidate human subjects are identified in the fields of view (FOVs) of each of the connected depth cameras, NUI system 22 may make the determination as to which human subject (or subjects) will provide user input to computer system 18—i.e., which will be identified as a user. In one embodiment, a human subject may be selected as a user based on proximity to display 14 or depth camera 32, and/or position in a field of view of a depth camera. More specifically, the user selected may be the human subject closest to the depth camera or nearest the center of the FOV of the depth camera. In some embodiments, the NUI system may also take into account the degree of translational motion of a human subject—e.g., motion of the centroid of the subject—in determining whether that subject will be selected as a user. For example, a subject that is moving across the FOV of the depth camera (moving at all, moving above a threshold speed, etc.) may be excluded from providing user input.

After one or more users are identified, NUI system 22 may begin to process posture information from such users. The posture information may be derived computationally from depth video acquired with depth camera 32. At this stage of execution, additional sensory input—e.g., image data from a color camera 34 or audio data from listening system 26—may be processed along with the posture information. Presently, an example mode of obtaining the posture information for a user will be described.

In one embodiment, NUI system 22 may be configured to analyze the pixels of a depth map that correspond to a user, in order to determine what part of the user's body each pixel represents. A variety of different body-part assignment techniques can be used to this end. In one example, each pixel of the depth map with an appropriate person index (vide supra) may be assigned a body-part index. The body-part index may include a discrete identifier, confidence value, and/or body-part probability distribution indicating the body part or parts to which that pixel is likely to correspond. Body-part indices may be determined, assigned, and saved in any suitable manner.

In one example, machine-learning may be used to assign each pixel a body-part index and/or body-part probability distribution. The machine-learning approach analyzes a user with reference to information learned from a previously trained collection of known poses. During a supervised training phase, for example, a variety of human subjects may be observed in a variety of poses; trainers provide ground truth annotations labeling various machine-learning classifiers in the observed data. The observed data and annotations are then used to generate one or more machine-learned algorithms that map inputs (e.g., observation data from a depth camera) to desired outputs (e.g., body-part indices for relevant pixels).

Figure 12:
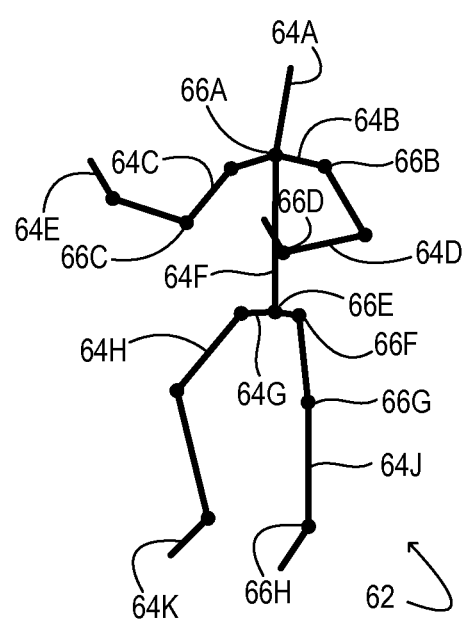
FIG. 12 shows aspects of an example virtual skeleton in accordance with an embodiment of this disclosure.

Thereafter, a virtual skeleton is fit to at least one human subject identified. In some embodiments, a virtual skeleton is fit to the pixels of depth data that correspond to a user. FIG. 12 shows an example virtual skeleton 62 in one embodiment. The virtual skeleton includes a plurality of skeletal segments 64 pivotally coupled at a plurality of joints 66. In some embodiments, a body-part designation may be assigned to each skeletal segment and/or each joint. In FIG. 12, the body-part designation of each skeletal segment 64 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 66 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 12 is in no way limiting. A virtual skeleton consistent with this disclosure may include virtually any type and number of skeletal segments and joints.

In one embodiment, each joint may be assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any, some, or all of these parameters for each joint. In this manner, the metrical data defining the virtual skeleton—its size, shape, and position and orientation relative to the depth camera may be assigned to the joints.

Via any suitable minimization approach, the lengths of the skeletal segments and the positions and rotational angles of the joints may be adjusted for agreement with the various contours of the depth map. This process may define the location and posture of the imaged human subject. Some skeletal-fitting algorithms may use the depth data in combination with other information, such as color-image data and/or kinetic data indicating how one locus of pixels moves with respect to another.

As noted above, body-part indices may be assigned in advance of the minimization. The body-part indices may be used to seed, inform, or bias the fitting procedure to increase its rate of convergence. For example, if a given locus of pixels is designated as the head of the user, then the fitting procedure may seek to fit to that locus a skeletal segment pivotally coupled to a single joint—viz., the neck. If the locus is designated as a forearm, then the fitting procedure may seek to fit a skeletal segment coupled to two joints— one at each end of the segment. Furthermore, if it is determined that a given locus is unlikely to correspond to any body part of the user, then that locus may be masked or otherwise eliminated from subsequent skeletal fitting. In some embodiments, a virtual skeleton may be fit to each of a sequence of frames of depth video. By analyzing positional change in the various skeletal joints and/or segments, the corresponding movements—e.g., gestures, actions, or behavior patterns—of the imaged user may be determined. In this manner, the posture or gesture of the one or more human subjects may be detected in NUI system 22 based on one or more virtual skeletons.

The foregoing description should not be construed to limit the range of approaches usable to construct a virtual skeleton, for a virtual skeleton may be derived from a depth map in any suitable manner without departing from the scope of this disclosure. Moreover, despite the advantages of using a virtual skeleton to model a human subject, this aspect is by no means necessary. In lieu of a virtual skeleton, raw point-cloud data may be used directly to provide suitable posture information.

In subsequent acts of method 58, various higher-level processing may be enacted to extend and apply the gesture detection undertaken at 60. In some examples, gesture detection may proceed until an engagement gesture or spoken engagement phrase from a potential user is detected. After a user has engaged, processing of the data may continue, with gestures of the engaged user decoded to provide input to computer system 18. Such gestures may include input to launch a process, change a setting of the OS, shift input focus from one process to another, or provide virtually any control function in computer system 18.

Returning now to FIG. 11, at 68 of method 58 it is determined whether the both hands of the subject have dropped below a pre-defined zone of interaction—e.g., the zone above level 52 of FIG. 4. If the subject's hands have dropped below the pre-defined zone of interaction, then the method advances to 70, where the subject is disengaged as a user of the computer system. If the subject's hands have not dropped below the zone of interaction, then the method advances to 72. At 72, the subject's grip state is detected. In one embodiment, the grip state detected at 72 is the state of the subject's active hand. In other embodiments, the grip state defines the state of both hands—e.g., left hand closed, right hand open. In some embodiments, the grip state evaluated at 72 is the grip state that was in effect while the user enacted the hand gesture detected at 60.

At 74 it is assessed whether the subject's grip was closed during the gesture. If the subject's grip was not closed—i.e., was open—during the gesture, then the method advances to 76. For purposes of advancing to 76 on detection of an open grip state, it will be noted that different embodiments may provide somewhat different control logic. In one embodiment, the subject's grip is determined to be open (i.e., not closed) if even one hand is open. In another scenario, both hands must be open to advance to 76.

In some embodiments, grip state may be assessed by way of the skeletal tracking methodology described hereinabove—viz., with reference to action 60 of the illustrated method. In particular, a virtual skeleton 62 of user 20 may be analyzed to locate the pixels that correspond to the hand. Such pixels, along with corresponding loci of one or more color, infrared, and/or depth images (if available) are examined. In a particular embodiment, classifiers relevant to grip state (based, for example, on prior machine learning) are evaluated to assess whether they are more consistent with an open or closed hand.

Continuing in FIG. 11, at 76 it is determined whether either of the subject's hands is raised over a pre-defined threshold or otherwise moved into a pre-defined engagement zone (vide supra). If so, then the subject having a raised hand and open grip is engaged, at 77, as a user of the computer system. In some embodiments, a subject exhibiting this posture is only engaged as user of the computer system if he or she is also facing the display and/or vision system of the computer system. By requiring a pre-defined engagement gesture, the system is able to focus on a smaller number of user interactions at a given time—e.g., to decipher gestures only for skeletons corresponding to a user that has signaled an intent to engage.

After a user's engagement has been established, the system may then begin to look for UI interactions, such as UI selection and activation, and canvas transformations. Thus, if it is determined at 76 that the subject's hand is not raised over the threshold, etc., then the method advances to 78, where it is determined whether the subject has enacted a push gesture as described hereinabove. If the subject has enacted a push gesture, then the method advances to 80, where a UI object arranged on a UI canvas of the display is activated based on the gesture. The activated object may be a previously selected tile, icon, or control, for example. 'Activation' of a UI object can mean a number of things depending on the embodiment or use scenario. If the UI object is a control such as a checkbox or radio button, activation of that object may equate to toggling the state of the control—e.g., checked/unchecked, on/off, etc. If the UI object represents a movie or music track, for instance, activation of that object may equate to the act of playing the movie or music track. On the other hand, if the UI object represents a text document, activation of that object may equate to one of several options: edit, print, delete, etc. In embodiments such as this, UI presented on the display subsequent to activation of the object may offer an appropriate menu of action items to the user, so that a selection can be made. In other embodiments, a vocalized action command from the user may be received by listening system 26 and recognized via speech-recognition engine 38. In these and other embodiments, one or more UI elements may be activated in various ways without transformation of the UI canvas on which the elements are arranged.

Continuing in FIG. 11, if at 74 the subject's grip was closed while enacting the gesture, then the method advances to 82, where it is determined whether the currently active process should relinquish input and/or display focus to the OS shell. In other words, it is determined at this point whether the user's gesture will be interpreted as a system gesture rather than a request to transform the UI canvas. Factors that may influence whether a system gesture is indicated are described below. In any event, if it is determined that no system gesture is indicated, then the method advances to 84, where the UI canvas is transformed based on the detected gesture—e.g., closed hand moving right or left to pan, closed hand moving up or down to scroll, closed compression gesture to zoom out and closed stretching gesture to zoom in. In these examples, the UI canvas may be transformed without activation of any of the UI elements arranged on the canvas. In other examples, combined transformation and activation is envisaged. In some embodiments, the decision of whether to transform the UI canvas or take some other action may further depend on mouse-pointer position. For instance, if the user's grip state is closed while the mouse pointer is residing on top of the canvas, then the canvas may be transformed. However, if the grip state is closed while the cursor resides on top of a UI object, and if that object is malleable (e.g., a tile or picture) then the object itself may be transformed. After a UI canvas is transformed, it then may be redrawn on display 14, at 86 of method 58. Conversely, if it is determined that a system gesture is indicated, then the method advances to 88, where access to the OS shell is provided.

One type of system gesture involves reducing the active process to an icon or tile, and concurrently viewing a larger portion of the OS shell, via a two-handed compression gesture with closed hands, as in FIG. 8. In some embodiments, this action may shift input focus to the OS shell of the computer system. Once input focus is shifted to the OS shell, the user may have the opportunity to launch different applications or change OS settings. Also at this level, the user may have the ability to expand a notification initially presented as an icon or balloon—e.g., by making a two-handed stretch gesture with closed hands, as in FIG. 7.

Referring again to 82 of method 58, various factors may serve to disambiguate a closed-handed gesture intended to access the OS shell from a similar or even identical gesture intended to transform the UI canvas. The above method describes a way of decoding NUI from a user of a computer system under first and second operating conditions of the system. During the first operating condition, a first action (e.g., panning a UI canvas) is taken in response to detection by the vision system of a hand gesture of the subject—in one example, a closed hand moving to the left. During the second operating condition, a second action, different from the first (e.g., zooming out to an OS shell) is taken in response to detection of the same hand gesture of the same subject. Accordingly, the second action includes redirection of the NUI to a process not having current input focus—the OS shell in this example. As noted above, various detectable states may distinguish the first operating condition from the second. In one example, the first operating condition may be a condition in which only one hand is closed, and wherein the second operating condition may be a condition in which both hands have been closed for a predetermined interval or longer. As shown by this example, detecting the grip state at 72 may include resolving a change in the grip state, wherein a closing grip-state change triggers transition to a mode of transforming the UI canvas based on the gesture, and wherein an opening grip-state change triggers transition to a mode of activating a UI object based on the gesture.

In some embodiments, the reverse system gesture—viz., pulling the hands apart—may also be an overloaded gesture. During a first operating condition, this gesture may cause a notification to be opened. During a second operating condition, it may trigger a return to the previously active application or content item. Since notifications have short time windows for activation, opening a notification may take precedence and serve as the default effect for this gesture. On the other hand, resuming the previous application may require the user to be 'on the home screen' or have other navigation constraints. Accordingly, so when the reverse system gesture is detected, the system may first determine whether a notification is active. If so, then the notification will be opened; if not, then the previous application may be opened, provided the user is on the home screen. If neither condition is true, then nothing is done with the gesture.

More generally, the above examples demonstrate the act of selecting, from a set of gestural inputs detectable by the vision system, a context-appropriate subset. This subset is based on an operating condition of the computer system. Then, from a set of actions executable in the computer system, a context-appropriate subset is selected based on the operating condition. Once the range of gestural inputs and the range of associated actions have been reduced in this manner, the gestural input that the user intends to make is more easily detected and mapped to an appropriate action. This approach increases the reliability of NUI detection by filtering both the detected gesture and the resulting action based on context.

As evident from the foregoing description, the methods and processes described herein may be tied to a computing system of one or more computing machines. Such methods and processes may be implemented as a computer-application program or service, an application-programming interface (API), a library, and/or other computer-program product.

Shown in FIG. 2 in simplified form, computer system 18 is a non-limiting example of a system used to enact the methods and processes described herein. The computer system includes a logic machine 90 and an instruction-storage machine 92. The computer system also includes a display 14, a communication system 94, and various components not shown in FIG. 2.

Logic machine 90 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 90 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Instruction-storage machine 92 includes one or more physical devices configured to hold instructions executable by logic machine 90 to implement the methods and processes described herein. When such methods and processes are implemented, the state of the instruction-storage machine may be transformed—e.g., to hold different data. The instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The instruction-storage machine may include volatile, nonvolatile, dynamic, static, read/write, read-only, random-access, sequential-access, location-addressable, file-addressable, and/or content-addressable devices.

It will be appreciated that instruction-storage machine 92 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 90 and instruction-storage machine 92 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of a computing system implemented to perform a particular function. In some cases, a module, program, or engine may be instantiated via logic machine 90 executing instructions held by instruction-storage machine 92. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, communication system 94 may be configured to communicatively couple NUI system 22 or computer system 18 with one or more other computing devices. The communication system may include wired and/or wireless communication devices compatible with one or more different communication protocols. As non-limiting examples, the communication system may be configured for communication via a wireless telephone network, or a wired or wireless local- or wide-area network. In some embodiments, the communication system may allow a computing system to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted in a computing machine operatively coupled to a display and to a vision system having at least one camera, a method to decode natural user input (NUI) from a human subject, the method comprising:
displaying an operating system (OS) shell of an OS of the computing machine, the OS shell including a user-interface (UI) element for each of a plurality of applications of the computing machine,
detecting in three dimensions a hand gesture and concurrent grip state of the human subject while displaying the OS shell;
modifying an extent of visibility of the OS shell based on the gesture if the grip state is close-fisted, wherein modifying the extent of visibility includes displaying a larger portion of the OS shell than currently displayed, to enable different applications to be launched; and
launching an application of the computing machine if the gesture is directed to a UI element presented on the OS shell and associated with the application and if the grip state is open-handed.

2. The method of claim 1, wherein the gesture includes motion of at least one hand of the subject.

3. The method of claim 1, further comprising redrawing the OS shell when the extent of visibility of the OS shell is modified.

4. The method of claim 1, wherein the open-handed grip-state gesture is a push gesture.

5. The method of claim 1, wherein the UI element is one or more of a tile, icon, or control.

6. The method of claim 1, wherein detecting the grip state includes resolving a change in the grip state, wherein a closing grip-state change triggers transition to a mode of modifying the extent of visibility of the OS shell, and wherein an opening grip-state change triggers transition to a mode of launching the application.

7. The method of claim 1 wherein displaying the larger portion of the OS shell exposes a plurality of different UI elements, which correspond to the different applications to be launched.

8. The method of claim 1 wherein displaying the larger portion of the OS shell exposes a greater number of UI elements than were exposed prior to the close-fisted gesture.

9. A computing machine configured to decode natural user input (NUI) from a human subject, the computing machine operatively coupled to a display and to a vision system having at least one camera and configured to detect a hand gesture of the subject in three dimensions, the computing machine comprising:
an operating system (OS) accessible to a user of the computing machine via an OS shell, the OS shell being configured to present a user-interface (UI) element for each of a plurality of applications of the computing machine, the OS having an application programming interface (API) to provide, based on the detected hand gesture, input to one or more processes of the computing machine, the input including:
input to signal engagement of the subject as a user of the computing machine,
input to signal disengagement of the subject as a user of the computing machine,
input to shift subsequent input focus to the OS shell upon detection of a close-fisted gesture, wherein shifting subsequent input focus includes reducing a process currently executing on the computing machine to an icon and displaying a larger portion of the OS shell than currently displayed, and
input to launch an application of the computing machine upon detection of an open-handed push gesture directed to a UI element presented on the OS shell and associated with the application.

10. The computing machine of claim 9, wherein the open-handed gesture includes a press motion followed by a release motion.

11. The computing machine of claim 9, wherein the input to modify an extent of visibility of the OS is provided upon detection in the vision system of a two-handed stretch or compression gesture with both fists closed.

12. The computing machine of claim 9, wherein the input to signal engagement of the human subject as a user of the computing machine is provided upon detection of a raised hand and open palm of the subject as the subject faces the display.

13. The computing machine of claim 9, wherein the input to signal disengagement of the human subject as a user of the computing machine is provided upon detection of both hands of the subject dropping below a pre-defined zone of interaction.

14. The computing machine of claim 9, wherein the input to the one or more processes further includes input to return to the OS shell from a currently running application, and wherein such input is provided upon detection of a two-handed zoom-out gesture by the subject.

15. The computing machine of claim 9, wherein the input to the one or more processes further includes input to open or expand the UI element, and wherein such input is provided upon detection of a two-handed zoom-in gesture by the subject.

16. Enacted in a computer system operatively coupled to a vision system, a method to decode natural user input (NUI) from a human subject, the method comprising:
displaying an operating system (OS) shell of an OS of the computing machine, the OS shell including a user-interface (UI) element for each of a plurality of applications of the computing machine;
from a set of gestural inputs detectable by the vision system, selecting a context-appropriate subset based on an operating condition of the computer system;
from a set of actions executable in the computer system, selecting a context-appropriate subset based on the operating condition of the computer system, the operating condition including a grip state of the human subject;
detecting a gestural input from the context-appropriate subset of gestural inputs while displaying the OS shell; and
executing an action from the context-appropriate subset of executable actions responsive to the detected gestural input, the action including modifying an extent of visibility of the OS shell based on the gesture if the grip state is close-fisted, wherein modifying the extent of visibility includes displaying a larger portion of the OS shell than currently displayed, to enable different applications to be launched; and launching an application of the computing machine if the gesture is directed to a UI element presented on the OS shell and associated with the application and if the grip state is open-handed.

17. The method of claim 16, wherein the action includes seizing display or input focus from the process currently running.

* * * * *